No. 739,077. PATENTED SEPT. 15, 1903.
J. J. GUNN.
INSULATED RAIL JOINT.
APPLICATION FILED MAY 26, 1902.
NO MODEL.
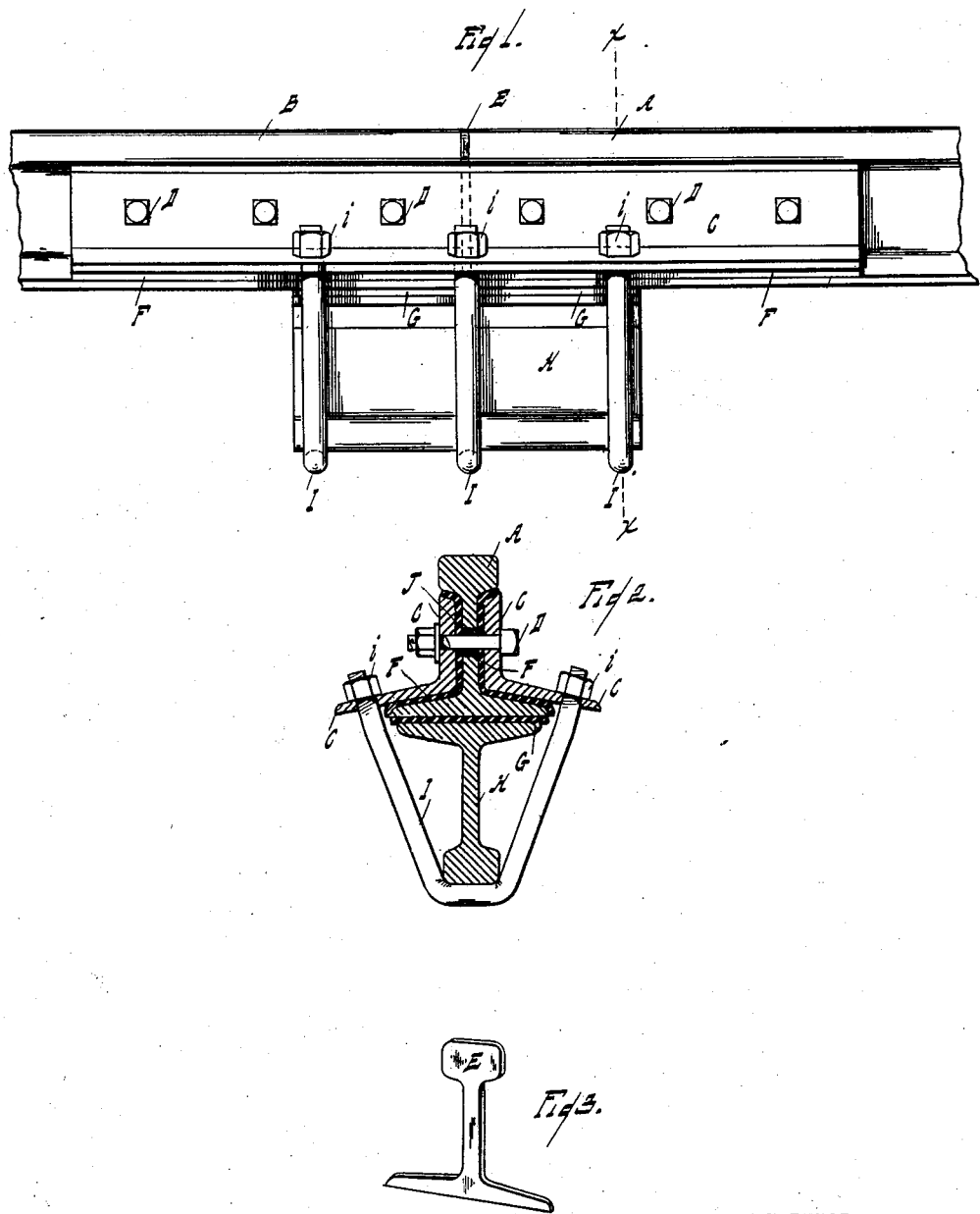
WITNESSES
Lotta Lee Hayton.
T. Y. Massey.
INVENTOR
John Joseph Gunn
By Parker & Burton Attorneys.

No. 739,077. Patented September 15, 1903.

UNITED STATES PATENT OFFICE.

JOHN JOSEPH GUNN, OF YPSILANTI, MICHIGAN.

INSULATED RAIL-JOINT.

SPECIFICATION forming part of Letters Patent No. 739,077, dated September 15, 1903.

Application filed May 26, 1902. Serial No. 108,909. (No model.)

*To all whom it may concern:*

Be it known that I, JOHN JOSEPH GUNN, a citizen of the United States, residing at Ypsilanti, county of Washtenaw, State of Michigan, have invented a certain new and useful Improvement in Insulated Rail-Joints; and I declare the following to be a full, clear, and exact description of the invention, such as will enable others skilled in the art to which it pertains to make and use the same, reference being had to the accompanying drawings, which form a part of this specification.

My invention relates to insulated rail-joints for block systems in railroads; and the object of my improvements is to provide an improved insulated rail-joint which is convenient to apply and durable.

Referring to the accompanying drawings, Figure 1 is an elevation showing the ends of two rails insulated from each other and connected together by a joint embodying my invention. Fig. 2 is a section on the line $x\,x$ of Fig. 1. Fig. 3 is a detail showing in perspective the insulation between the ends of the two rails.

A is the end of one rail, and B is the end of the other rail.

E is a piece of insulation having the form of the cross-section of the rail, interposed between the ends of the rails A and B. The rails are of the T or I form of cross-section.

H is a short piece of rail placed with its base toward the bases of the rails A and B and lapping the joint between said rails.

C C are fish-plates having flanges extending approximately horizontal beyond the bases of the rails A, B, and H. These plates fit into the hollow of the rails between the head and base.

D represents bolts securing the opposite fish-plates C C together in the usual way.

F F are pieces of insulation interposed between the webs and bases of the rails A and B and the fish-plates C C, so as to insulate said plates from said rails.

J is a sleeve of insulating material surrounding each of the bolts D and insulating said bolts from the rails A B.

G is a piece of insulation interposed between the rail-section H and the rails A B.

I represents U-shaped bolts passing below the rail-section H and having their ends passing through holes in the flanges of the fish-plates C C beyond the bases of the rails.

$i\,i$ are nuts upon the ends of the bolts I.

The rails A B are bound together in the usual way by the fish-plates C C, except that said fish-plates are insulated, as above described, from said rails. The ends of the rails A B are still more firmly bound together by the section of rail H, placed below them and drawn firmly to place by nuts $i\,i$ upon the ends of the U-shaped bolts I.

It will be noticed that the above-described joint is quite easily applied, that the rails A and B are completely insulated from each other, and that when a weight, as that of a passing car, rests upon the end of one of said rails the ends of both rails A B will bend down together, as they are secured together, so that there is no relative motion of the parts to break or abrade the insulation, as in joints commonly in use for this purpose.

What I claim is—

1. An insulated rail-joint consisting of fish-plates having flanges extending beyond the base of the rails, insulating material interposed between the fish-plates and the rails, bolts passing through said fish-plates and rails insulated from the latter, a piece of rail placed beneath said rails with its base toward the same and lapping the joint, insulating material interposed between the rails and said piece of rail and U-bolts passing beneath said piece of rail and engaging with the flanges of the fish-plates beyond the rail-base.

2. An insulated joint for T-shaped rails consisting of fish-plates having flanges extending beyond the rail-base, said plates being located in the hollow of the rail between the head and base, insulating material interposed between said fish-plates and the rail web and base, bolts passing through said fish-plates and rails insulated from the latter, a piece of T-shaped rail placed beneath said rails with its base toward the same; insulating material interposed between the rails and said piece of rail, and U-bolts passing beneath said piece of rail and engaging with the flanges of the fish-plates beyond the rail.

In testimony whereof I sign this specification in the presence of two witnesses.

JOHN JOSEPH GUNN.

Witnesses:
LEE M. BROWN,
ISAAC DAVIS.